(12) United States Patent
Ren et al.

(10) Patent No.: US 12,292,899 B2
(45) Date of Patent: May 6, 2025

(54) METHOD FOR SCHEDULING MULTI-NODE CLUSTER OF K-DB DATABASE, DEVICE, AND MEDIUM THEREOF

(71) Applicant: INSPUR SUZHOU INTELLIGENT TECHNOLOGY CO., LTD., Jiangsu (CN)

(72) Inventors: Qili Ren, Jiangsu (CN); Yankui Du, Jiangsu (CN); Benshuai Wei, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/028,367

(22) PCT Filed: Sep. 29, 2021

(86) PCT No.: PCT/CN2021/121916
§ 371 (c)(1),
(2) Date: Mar. 24, 2023

(87) PCT Pub. No.: WO2022/134727
PCT Pub. Date: Jun. 30, 2022

(65) Prior Publication Data
US 2024/0311391 A1    Sep. 19, 2024

(30) Foreign Application Priority Data
Dec. 24, 2020   (CN) .......................... 202011554037.0

(51) Int. Cl.
G06F 16/27   (2019.01)
G06F 9/48    (2006.01)

(52) U.S. Cl.
CPC ............ *G06F 16/27* (2019.01); *G06F 9/4881* (2013.01)

(58) Field of Classification Search
CPC ...................................................... G06F 16/27
(Continued)

(56) References Cited

U.S. PATENT DOCUMENTS

| 8,312,037 B1 * | 11/2012 | Bacthavachalu | ..... G06F 9/4881 |
| | | | 707/769 |
| 2004/0044702 A1 * | 3/2004 | Ferreira Alves | .... G06F 16/2358 |
| | | | 707/999.203 |

(Continued)

FOREIGN PATENT DOCUMENTS

| CN | 104424240 A | 3/2015 |
| CN | 105512268 A | 4/2016 |
| CN | 112632116 A | 4/2021 |

OTHER PUBLICATIONS

PCT/CN2021/121916 International search report.

*Primary Examiner* — Muluemebet Gurmu
(74) *Attorney, Agent, or Firm* — IPro, PLLC (57) ABSTRACT

A method for scheduling a multi-node cluster of K-DB database, comprising: connecting an application terminal and scheduler to a cluster of K-DB database through a service extranet, and connecting respective nodes in the cluster through an intranet; in response to that an application request is received by the scheduler, determining whether the request is a table query, and in response to that the request is the table query, determining whether the request is a multi-table-joint query; in response to that the request is the multi-table-joint query, determining tables to be queried, and determining nodes having a highest table version; determining types of change values of the respective tables, and calculating amount of updated data of the respective tables; and selecting a node with the smallest amount of updated data as a computing node, synchronizing the tables of other nodes to the computing node, and executing the multi-table-joint query.

20 Claims, 2 Drawing Sheets

(58) Field of Classification Search
USPC .......................................................... 707/634
See application file for complete search history.

(56) References Cited

U.S. PATENT DOCUMENTS

| | | | |
|---|---|---|---|
| 2007/0275726 A1* | 11/2007 | Lee ................... | H04W 36/0055 |
| | | | 455/436 |
| 2008/0208938 A1* | 8/2008 | Lin ..................... | G06F 16/2343 |
| 2009/0063582 A1* | 3/2009 | Anna .................. | G06Q 10/107 |
| | | | 707/999.203 |
| 2009/0187611 A1* | 7/2009 | Weltman ................. | G06F 16/10 |
| | | | 707/999.203 |
| 2017/0147640 A1 | 5/2017 | Gaza et al. | |
| 2019/0163775 A1 | 5/2019 | Abrashkevich et al. | |
| 2021/0334252 A1* | 10/2021 | Tong ..................... | G06F 16/164 |

\* cited by examiner

METHOD FOR SCHEDULING MULTI-NODE CLUSTER OF K-DB DATABASE, DEVICE, AND MEDIUM THEREOF

CROSS-REFERENCE TO RELATED APPLICATION

The present disclosure claims the priority of the Chinese patent application filed on Dec. 24, 2020 before the China National Intellectual Property Administration with the application number of 202011554037.0 and the title of "K-DB DATABASE MULTI-NODE CLUSTER SCHEDULING METHOD AND SYSTEM, DEVICE, AND MEDIUM", which is incorporated herein in its entirety by reference.

FIELD

The disclosure relates to the field of database, and more particularly to a method, a system, a computer device and a computer-readable medium, for scheduling a multi-node cluster of K-DB database (an enterprise-level database system developed by Inspur Company).

BACKGROUND

Current mainstream database system architectures include several kinds, for example, complete sharing, storage sharing, complete unsharing, and so on. Among them, a completely-shared system, for example, a SMP (Symmetric Multi-Processor) server, is limited to a single-node server, which is usually expensive, and scalability and performance thereof are limited accordingly. A storage-shared system allows the system to have a plurality of instances of server, connected to shared storage devices. Such system may realize multi-computer parallelism and ensure high availability of the system, but it needs a data pipeline to filter every I/O information to a shared-storage subsystem, which requires hardware relatively high, and is not a high-performance solution.

Compared with the above, a data-warehouse platform based on hardware generally adopt a completely-unshared system. In such a system, a communication function is deployed on a network interconnection system of high-bandwidth, and a user may execute a parallel query through a master control node. An important advantage of the system is that each node has a separate channel to local disks, which not only simplifies the system, but also provides good scalability.

SUMMARY

Based on the above purpose, one aspect of the embodiments of the disclosure provides a method for scheduling a multi-node cluster of K-DB database, including following steps: connecting an application terminal and a scheduler to a cluster of a K-DB database through a service extranet, and connecting respective nodes in the cluster of the database to each other through an intranet; in response to that an application request is received by the scheduler, determining whether the request is a table query, and in response to that the request is the table query, determining whether the request is a multi-table-joint query; in response to that the request is the multi-table-joint query, determining tables to be queried in the request, and determining respective nodes having a highest table version; determining types of change values of the respective tables according to types of latest-update operations of the respective tables, and calculating amount of updated data of the respective tables according to the types of the change values; and selecting a node, the amount of updated data of which is the smallest, from the respective nodes having the highest table version, as a computing node, synchronizing the tables of other nodes having the highest table version to the computing node, and executing the multi-table-joint query based on the computing node.

In some embodiments, the method further includes: in response to that the request is a single-table query, selecting one or more nodes having the highest table version, to forward the request to the selected node.

In some embodiments, the method further includes: in response to that a request for updating table is received during the single-table query, selecting nodes having a highest table version from nodes having no task of the table query, to update the selected nodes.

In some embodiments, the method further includes: in response to that the request is for updating table, determining whether the node having the highest table version is unique; and in response to that the node having the highest table version is unique, selecting the unique node, to forward the request to the unique node.

In some embodiments, the method further includes: in response to that the node having the highest table version is not unique, determining whether the node, whose state value is the lowest among the nodes having the highest table version, is unique; and in response to that the node, whose state value is the lowest among the nodes having the highest table version, is unique, updating the table at the unique node.

In some embodiments, the method further includes: in response to that the node, whose state value is the lowest among the nodes having the highest table version, is not unique, randomly selecting one node from the nodes whose state values are the lowest, to update the table of selected node, and locking the tables of other nodes.

In some embodiments, the method further includes: in response to that the table completes an update, adding a version number of the table of the node by one, and unlocking the tables of the other nodes.

Another aspect of the embodiments of the disclosure further provides a system for scheduling a multi-node cluster of K-DB database, including: a connecting module, configured to connect an application terminal and a scheduler to a cluster of a K-DB database through a service extranet, and connect respective nodes in the cluster of the database to each other through an intranet; a receiving module, configured to, in response to that an application request is received by the scheduler, determine whether the request is a table query, and in response to that the request is the table query, determine whether the request is a multi-table-joint query; a determining module, configured to, in response to that the request is the multi-table-joint query, determine tables to be queried in the request, and determine respective nodes having a highest table version; a calculating module, configured to determine types of change values of the respective tables according to types of latest-update operations of the respective tables, and calculate amount of updated data of the respective tables according to the types of the change values; and an executing module, configured to select a node, the amount of updated data of which is the smallest, from the respective nodes having the highest table version, as a computing node, synchronize the tables of other nodes having the highest table version to the computing node, and execute the multi-table-joint query based on the computing node.

Still another aspect of the embodiments of the disclosure further provides a computer device, including: at least one processor; and a memory, wherein computer instructions that are able to run on the processor, are stored in the memory, and when the computer instructions are executed by the processor, the steps of the above methods are realized.

Still another aspect of the embodiments of the disclosure further provides a computer-readable storage medium, wherein computer-readable instructions are stored in the non-volatile computer-readable storage medium, and when the computer-readable instructions are executed by the processor, the steps of the above methods are realized.

BRIEF DESCRIPTION OF THE DRAWINGS

In order to more clearly illustrate the technical solutions in the embodiments of the disclosure or in prior art, the following may briefly introduce the drawings needed to be used in illustrating the embodiments or the prior art. Apparently, the drawings in the following description are just embodiments of the disclosure. For those ordinary skilled in the field, they may further obtain other drawings according to the provided drawings without paying creative labor.

DETAILED DESCRIPTION OF THE EMBODIMENTS

In order to make purposes technical solutions and advantages of the disclosure more distinct, the following may further describe the embodiments of the disclosure in detail with reference to the embodiments and the accompanying drawings.

It should be noted that expressions using "first" and "second" in the embodiments of the present disclosure are intended to distinguish two different entities or different parameters with the same name, therefore, the "first" and "second" are just for the sake of convenience of expression, and should not be understood as limiting the embodiments of the present disclosure, which is no longer specified in the subsequent embodiments.

The completely-unshared system in existing technology may not separate data and computing of scheduling, so a pressure of node is relatively high.

In view of the above, a purpose of the embodiments of the disclosure is to provide a method, a system, a computer device and a computer-readable storage medium, for scheduling a multi-node cluster of K-DB database. A scheduler used at an upper layer distributes an application request and schedules data, and a cluster of a database at a bottom layer adopts a completely peer-to-peer architecture of the completely-unshared system, such that respective nodes are completely peer-to-peer, thus separating the data and computing of scheduling, to reduce a pressure of node.

Figure 1:
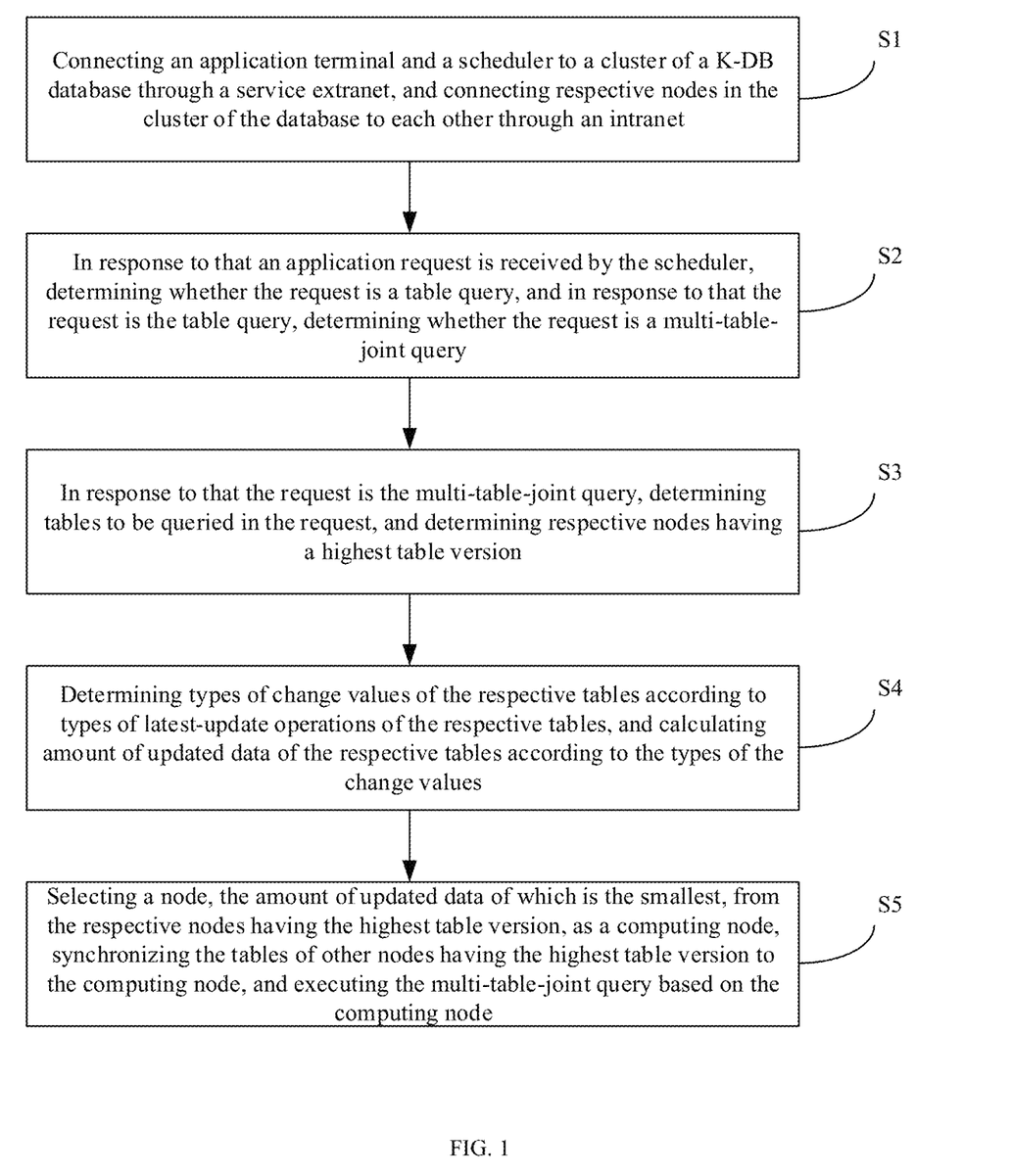
FIG. 1 is a flow chart of an embodiment of a method for scheduling a multi-node cluster of K-DB database provided by the disclosure.

Based on the above purposes, in a first aspect of the embodiments of the disclosure, an embodiment of a method for scheduling a multi-node cluster of K-DB database is provided. FIG. 1 is a flow chart of an embodiment of a method for scheduling a multi-node cluster of K-DB database provided by the disclosure. As shown in FIG. 1, the embodiment of the disclosure includes following steps S1-S5.

S1. Connecting an application terminal and a scheduler to a cluster of a K-DB database through a service extranet, and connecting respective nodes in the cluster of the database to each other through an intranet.

S2. In response to that an application request is received by the scheduler, determining whether the request is a table query, and in response to that the request is the table query, determining whether the request is a multi-table-joint query.

S3. In response to that the request is the multi-table-joint query, determining tables to be queried in the request, and determining respective nodes having a highest table version.

S4. Determining types of change values of the respective tables according to types of latest-update operations of the respective tables, and calculating amount of updated data of the respective tables according to the types of the change values.

S5. Selecting a node, the amount of updated data of which is the smallest, from the respective nodes having the highest table version, as a computing node, synchronizing the tables of other nodes having the highest table version to the computing node, and executing the multi-table-joint query based on the computing node.

As used in the specification, an item of "multi-table-joint query" is referred to that a plurality of tables are made correlated to each other through a connection condition, thus data may be obtained from the plurality of tables. The "table version" is used to control a latest state of a data table, and the table whose version is the highest, is a table having the latest state. The "scheduling", in computer, means approaches for allocating resources required for working, and the resources may be referred to virtue resources for example, thread, process, or data stream, and referred to hardware resources for example, processor, network connection card, or expansion card as well. A program for performing a work of the "scheduling" is called a "scheduler", and the scheduler may make a plurality of subtasks formed by splitting each SQL (Structured Query Language) statement, be processed in parallel during an execution process, so as to thoroughly utilize the resources of the entire multi-node cluster of K-DB database as much as possible.

The embodiments of the disclosure are a method for scheduling a multi-node cluster of K-DB database based on a completely-unshared system. A main function of the method is to receive an application request, schedule the request to corresponding nodes of database, to realize a highly-concurrent query and a function for synchronizing data of the nodes in the cluster of the database. The scheduler used at an upper layer distributes the application request and schedules the data, the cluster of the database at a bottom layer adopts a completely peer-to-peer architecture of the completely-unshared system, and the respective nodes are completely peer-to-peer, an advantage of which is to separate the data and computing of scheduling, to reduce a pressure of node.

Figure 2:
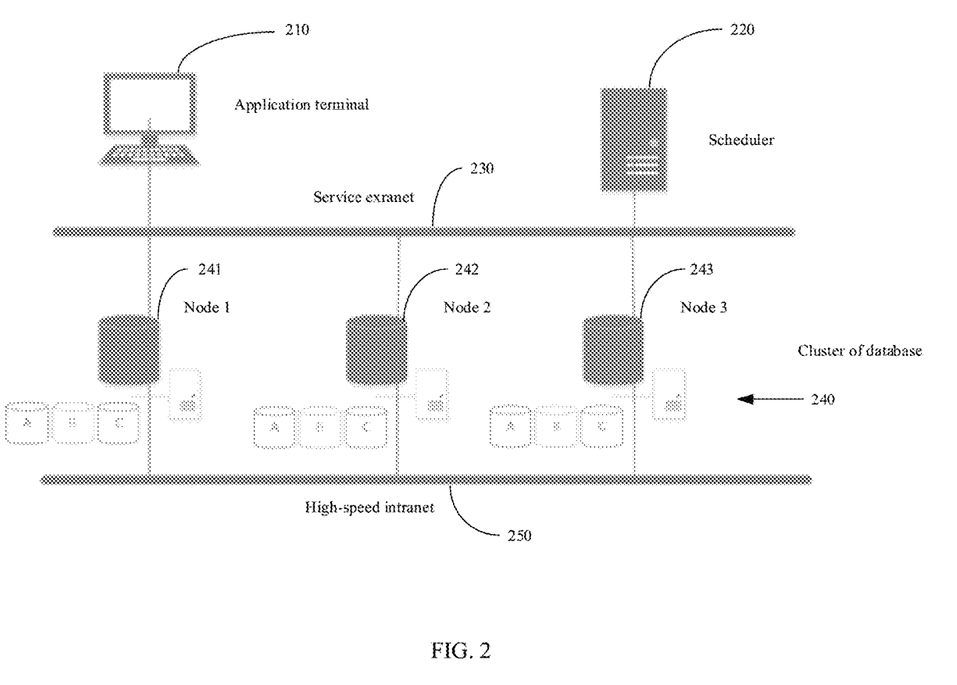
FIG. 2 is a schematic diagram of a hardware architecture adopted by the embodiment of the method for scheduling a multi-node cluster of K-DB database provided by the disclosure.

The application terminal and the scheduler are connected to the cluster of the K-DB database through the service extranet, and the respective nodes in the cluster of the database are connected to each other through the intranet. FIG. 2 is a schematic diagram of a hardware architecture adopted by the embodiment of the method for scheduling a multi-node cluster of K-DB database provided by the disclosure. As shown in FIG. 2, an application terminal 210 and a scheduler 220 access a cluster 240 of a K-DB database through a service extranet 230. The respective nodes in the cluster of the database are connected to each other through a high-speed intranet 250, and the respective nodes synchronize data through logs thereof. FIG. 2 shows a node 1 (241), a node 2 (242) and a node 3 (243). It should be understood that the cluster of the database may include other numbers of the nodes.

Every initial data of databases of the respective nodes of the cluster 240 of K-DB database is consistent with each other. The scheduler 220 records state information of the tables in the databases by a unit of table, and the state information mainly includes versions of the tables of the respective nodes, sizes of the tables thereof, SQL statements for modifying corresponding to respective table versions thereof, and state values of the respective nodes. For example, the database has three tables A, B and C, and initially, data of the tables of the three nodes is consistent with each other, and the table versions recorded in the scheduler 220 are completely consistent with each other as well. The following table is information recorded in the scheduler 220, which records states of the respective nodes and the tables thereof in an initial state. A size of version number of the table represents times the table is updated. Each time the table is updated, that is, each time a modifying operation is performed on the data of the table, the version of the table is added by one. The state value reflects a busy degree of the database of the node. For one application request forwarded by the scheduler 220, if the node does not send a completion instruction, the state value of the node is added by one, which means that the node is performing a task. After the task is completed, the node sends a completion-confirmation instruction to the scheduler 220, and the state value thereof is reduced by one.

| Host | Table | Version | Physical space of table | Corresponding SQL for modifying | State Value |
|------|-------|---------|------------------------|--------------------------------|-------------|
| Node 1 | A | 1 | | | 0 |
|        | B | 1 | | | |
|        | C | 1 | | | |
| Node 2 | A | 1 | | | 0 |
|        | B | 1 | | | |
|        | C | 1 | | | |
| Node 3 | A | 1 | | | 0 |
|        | B | 1 | | | |
|        | C | 1 | | | |

In response to that the application request is received by the scheduler 220, it is determined whether the request is a table query, and in response to that the request is the table query, it is determined whether the request is a multi-table-joint query. In response to that the request is the multi-table-joint query, tables to be queried in the request are determined, and respective nodes having a highest table version are determined. For example, the table A and the table B are executed with the joint query. The node 1 (241) and the node 2 (242) are respectively the node in which the version of the table A is the highest, and the node in which the version of the table B is the highest.

Types of change values of the respective tables are determined according to types of latest-update operations of the respective tables, and amount of updated data of the respective tables are calculated according to the types of the change values. If a latest-update SQL operation corresponding to the tables is an insert operation or a delete operation, the change values of actual sizes of the tables in the two nodes are calculated. If the latest-update SQL operation corresponding to the tables is an update operation, the change values of occupancy of the physical spaces of the tables in the two nodes are calculated. Continuing with the above example, an SQL operation corresponding to the table A is update, and an SQL operation corresponding to the table B is insert, then a calculation formula: MIN ((the physical space of the table A of the node 1 (241)—the physical space of the table A of the node 2 (242)), (the actual size of the table B of the node 2 (242)—the actual size of the table B of the node 1 (241))), is executed, wherein MIN presents to select the minimum.

As used in the specification, an item "types of change values" is referred to types of change caused by operations, for example, the insert and delete operations cause changes of the actual sizes of the tables, and the update operation just cause changes of sizes of the physical spaces occupied by the tables.

A node, amount of updated data of which is the smallest, is selected from the respective nodes having the highest table version, as a computing node, the tables of other nodes having the highest table version are synchronized to the computing node, and the multi-table-joint query is executed based on the computing node. A purpose of selecting the node whose update amount is the smallest, as the computing node, is to reduce data amount to be computed and data amount to be transmitted by network. For example, if updated data amount of the node 1 (241) is the smallest, the scheduler 220 sends an instruction to the node 2 (242), to instruct the node 2 (242) to synchronize the table B to the node 1 (241). After synchronization, the node 1 (241) performs the joint query for the table A and the table B.

In some embodiments, the method further includes: in response to that the request is a single-table query, selecting one or more nodes having the highest table version, to forward the request thereto. The scheduler 220 receives the application request, checks the table to be queried in the request, retrieves recorded information, and selects one or more nodes having the highest table version to forward the application request thereto.

In some embodiments, the method further includes: in response to that a request for updating table is received during the single-table query, selecting nodes having a highest table version from nodes having no task of the table query, to update the selected nodes. If a new application request for modifying data of table appears during a query operation for the table, the nodes having the highest table version and having no task of the table query are retrieved, to perform a data-update operation on the retrieved nodes, and after the tasks of the table query on other nodes are completed, a data synchronization may be performed thereon. For example, the table A is queried, one or more nodes whose version of table A is the highest are retrieved, and one or more requests are forwarded thereto. The node of database receives the request, and performs the query operation. The query operation does not change the version of the table, but may change the state value of the node. During the query operation, the state value of the node may increase accordingly.

In some embodiments, the method further includes: in response to that the request is for updating table, determining whether the node having the highest table version is unique; and in response to that the node having the highest table version is unique, selecting the unique node, to forward the request thereto. The scheduler 220 receives the application request, and records an SQL statement thereof. The scheduler 220 checks the table to be modified in the request, retrieves the recorded information, and selects one node having the highest table version, to forward the application request thereto.

In some embodiments, the method further includes: in response to that the node having the highest table version is not unique, determining whether the node, whose state value is the lowest among the nodes having the highest table version, is unique; and in response to that the node, whose state value is the lowest among the nodes having the highest table version, is unique, updating the table at the unique node. If there are a plurality of nodes having the highest table version, the state values of the nodes are selected to be checked, the node whose state value is the lowest, is selected, and an update is written therein.

In some embodiments, the method further includes: in response to that the node, whose state value is the lowest among the nodes having the highest table version, is not unique, randomly selecting one node from the nodes whose state values are the lowest, to update the table thereof, and locking the tables of other nodes. If the state values of the nodes are the same, one node is randomly selected therefrom, to perform the update operation on the table thereof, and the corresponding tables of other nodes are locked, which are just allowed to be queried, not allowed to be updated. For example, when there is an update operation for the table A, if the version number of the table A in the node 1 (241) is the highest, that is, the data thereof is the latest, the node 1 (241) is selected, an update is written therein, and the tables A of other nodes is locked, which are not allowed to perform a write operation. After the table A in the node 1 (241) completes the update operation, the node 1 (241) synchronizes to other nodes. If the version number of the table A in the node 1 and the node 2 is the highest, that is, the data thereof is the latest, the state values of the nodes are checked, and the node whose state value is the lowest, that is, whose task amount is the smallest, is selected to be updated.

In some embodiments, the method further includes: in response to that the table completes the update, adding the version number of the table of the node by one, and unlocking the tables of other nodes. After the update operation is completed, the node sends a confirmation instruction to the scheduler 220, then the table version thereof is added by one, and at the same time, the scheduler 220 unlocks table-level locks of the mentioned other nodes, and sends an instruction to instruct the node to broadcast updated data thereof to the mentioned other nodes. The mentioned other nodes receive the instruction and start to update data thereof, and after data updating is completed, the mentioned other nodes respectively send the confirmation instruction to the scheduler 220 as well, and the version numbers of the tables thereof are respectively added by one.

A core of the embodiments of the disclosure is the scheduler 220, which may realize the data synchronization of the respective nodes in the cluster, and provide services to applications outside the cluster. A characteristic of the cluster is to ensure that there is at least one copy of complete and latest database data in the cluster, and every node in the cluster may provide read and write services to outside. It does not pursue that the data synchronization among the nodes has a strong consistency, and it just needs to realize that final data is consistent with each other. A common database adopts a manner of allocating executable plans and gathering calculation results of the respective data nodes, while the present cluster differs the common database in that the present cluster adopts a data-localization strategy to complete calculation.

It should be particularly noted that the respective steps in the respective embodiments of the above method for scheduling a multi-node cluster of K-DB database, may be mutually crossed, replaced, added, and deleted, therefore, such reasonable permutation, combination and transformations, like the method for scheduling a multi-node cluster of K-DB database, should fall within the scope of protection of the disclosure as well, and the scope of protection of the disclosure should not be limited to the embodiments thereof.

Based on the above purpose, a second aspect of the embodiments of the disclosure provides a system for scheduling a multi-node cluster of K-DB database, including: a connecting module, configured to connect an application terminal and a scheduler to a cluster of a K-DB database through a service extranet, and connect respective nodes in the cluster of the database to each other through an intranet; a receiving module, configured to, in response to that an application request is received by the scheduler, determine whether the request is a table query, and in response to that the request is the table query, determine whether the request is a multi-table-joint query; a determining module, configured to, in response to that the request is the multi-table-joint query, determine tables to be queried in the request, and determine respective nodes having a highest table version; a calculating module, configured to determine types of change values of the respective tables according to types of latest-update operations of the respective tables, and calculate amount of updated data of the respective tables according to the types of the change values; and an executing module, configured to select a node, the amount of updated data of which is the smallest, from the respective nodes having the highest table version, as a computing node, synchronize the tables of other nodes having the highest table version to the computing node, and execute the multi-table-joint query based on the computing node.

In some embodiments, the system further includes: a querying module, configured to, in response to that the request is a single-table query, select one or more nodes having the highest table version, to forward the request thereto.

In some embodiments, the system further includes: a second receiving module, configured to, in response to that a request for updating table is received during the single-table query, select nodes having a highest table version from nodes having no task of the table query, to update the selected nodes.

In some embodiments, the system further includes: a judging module, configured to, in response to that the request is for updating table, determine whether the node having the highest table version is unique; and in response to that the node having the highest table version is unique, select the unique node, to forward the request thereto.

In some embodiments, the system further includes: a second judging module, configured to, in response to that the node having the highest table version is not unique, determine whether the node, whose state value is the lowest among the nodes having the highest table version, is unique; and in response to that the node, whose state value is the lowest among the nodes having the highest table version, is unique, update the table at the unique node.

In some embodiments, the system further includes: an updating module, configured to, in response to that the node, whose state value is the lowest among the nodes having the highest table version, is not unique, randomly select one node from the nodes whose state values are the lowest, to update the table thereof, and locking the tables of other nodes.

In some embodiments, the system further includes: an unlocking module, configured to, in response to that the table completes an update, add the version number of the table of the node by one, and unlock the tables of other nodes.

Based on the above purpose, a third aspect of the embodiments of the present disclosure provides a computer device, including: at least one processor; and a memory, wherein computer instructions that are able to run on the processor, is stored in the memory, and the instructions are executed by the processor to realize the following steps: S1. connecting an application terminal and a scheduler to a cluster of a K-DB database through a service extranet, and connecting respective nodes in the cluster of the database to each other through an intranet; S2. in response to that an application request is received by the scheduler, determining whether the request is a table query, and in response to that the request is the table query, determining whether the request is a multi-table-joint query; S3. in response to that the request is the multi-table-joint query, determining tables to be queried in the request, and determining respective nodes having a highest table version; S4. determining types of change values of the respective tables according to types of latest-update operations of the respective tables, and calculating amount of updated data of the respective tables according to the types of the change values; and S5. selecting a node, the amount of updated data of which is the smallest, from the respective nodes having the highest table version, as a computing node, synchronizing the tables of other nodes having the highest table version to the computing node, and executing the multi-table-joint query based on the computing node.

In some embodiments, the method further includes: in response to that the request is a single-table query, selecting one or more nodes having the highest table version, to forward the request thereto.

In some embodiments, the method further includes: in response to that a request for updating table is received during the single-table query, selecting nodes having a highest table version from nodes having no task of the table query, to update the selected nodes.

In some embodiments, the method further includes: in response to that the request is for updating table, determining whether the node having the highest table version is unique; and in response to that the node having the highest table version is unique, selecting the unique node, to forward the request thereto.

In some embodiments, the method further includes: in response to that the node having the highest table version is not unique, determining whether the node, whose state value is the lowest among the nodes having the highest table version, is unique; and in response to that the node, whose state value is the lowest among the nodes having the highest table version, is unique, updating the table at the unique node.

In some embodiments, the method further includes: in response to that the node, whose state value is the lowest among the nodes having the highest table version, is not unique, randomly selecting one node from the nodes whose state values are the lowest, to update the table thereof, and locking the tables of other nodes.

In some embodiments, the method further includes: in response to that the table completes an update, adding the version number of the table of the node by one, and unlocking the tables of other nodes.

Figure 3:
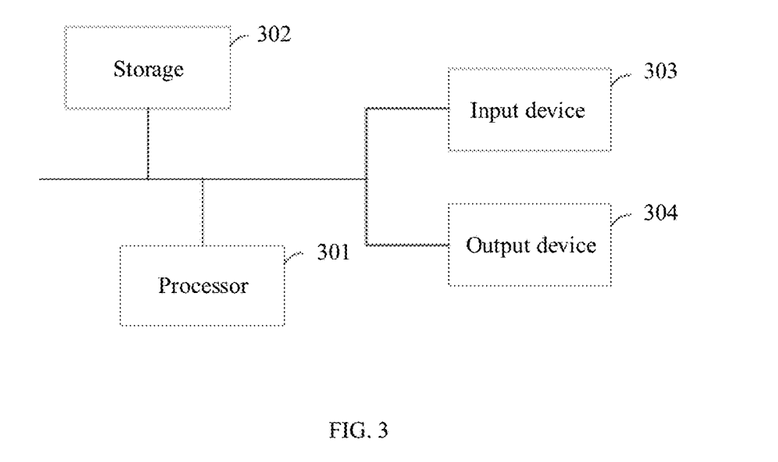
FIG. 3 is a schematic diagram of a hardware structure of an embodiment of a computer device for scheduling a multi-node cluster of K-DB database provided by the disclosure.

As shown in FIG. 3, it is a schematic diagram of a hardware structure of an embodiment of the above computer device for scheduling a multi-node cluster of K-DB database provided by the disclosure.

Taking the device shown in FIG. 3 as an example, the device includes a processor 301 and a storage 302, and may further include an input device 303 and an output device 304.

The processor 301, the storage 302, the input device 303 and the output device 304 may be connected by a bus or other means. In FIG. 3, connecting by the bus is taken as an example.

As a non-volatile computer-readable storage medium, the storage 302 may be used to store non-volatile software programs, non-volatile computer executable programs and modules, for example, program instructions/modules corresponding to the method for scheduling a multi-node cluster of K-DB database in the embodiments of the application. By running the non-volatile software programs, instructions and modules stored in the storage 302, the processor 301 executes various functional applications and data processing of a server, that is, realizes the method for scheduling a multi-node cluster of K-DB database in the above method embodiment.

The storage 302 may include a storage-program area and a storage-data area, wherein the storage-program area may store an operating system and application programs required by at least one function; and the storage-data area may store the data created according to a usage of the method for scheduling a multi-node cluster of K-DB database. In addition, the storage 302 may include a high-speed random-access memory, and may include a non-volatile memory as well, for example, at least a disk storage device, a flash memory device, or other non-volatile solid-state storage devices. In some embodiments, the storage 302 may include a storage set remotely relative to the processor 301, which may be connected to a local module through a network. Examples of the above networks include but are not limited to the Internet, an enterprise intranet, a local area network, a mobile communication network and a combination thereof.

The input device 303 may receive information, for example, an input user name, a password, and so on. The output device 304 may include a display device, for example, a display screen, and so on.

One or more program instructions/modules corresponding to the method for scheduling a multi-node cluster of K-DB database are stored in the storage 302, and when being executed by the processor 301, the one or more program instructions/modules execute the method for scheduling a multi-node cluster of K-DB database in any of the above method embodiments.

Any one of the embodiments of the computer device implementing the above method for scheduling a multi-node cluster of K-DB database, may realize a same or like effect as any corresponding one of the above method embodiments.

The disclosure further provides a computer-readable storage medium, wherein computer-readable instructions are stored in the computer-readable storage medium, and the computer-readable instructions execute the above method when executed by a processor.

Finally, it should be noted that those ordinary skilled in the art may understand and realize the respective or a part of processes in the above embodiments, which may be completed by the computer-readable instructions instructing relevant hardware. A program of the method for scheduling a multi-node cluster of K-DB database may be stored in the computer-readable storage medium, and when the program is executed, the program may include processes of the embodiments the above respective methods. Among them, a storage medium of the program may be a magnetic disk, an optical disk, a read-only storage memory (ROM) or a random storage memory (RAM), and so on. Embodiments of the above computer-readable instructions may realize a same or like effect as any corresponding one of the above method embodiments.

The disclosure has following beneficial technical effects: a scheduler used at an upper layer distributes an application request and schedules data, and a cluster of a database at a bottom layer adopts a completely peer-to-peer architecture of the completely-unshared system, such that respective nodes are completely peer-to-peer, thus separating the data and computing of scheduling, to reduce a pressure of node.

The above are exemplary embodiments disclosed by the disclosure. However, it should be noted that a variety of changes and modifications may be made without departing from the scope disclosed by the embodiments of the disclosure defined in the claims. The functions, steps and/or actions of the method claims according to the disclosed embodiments described herein need not be performed in any particular order. In addition, although elements disclosed in the embodiments of the disclosure may be described or required in individual form, they may further be understood as being plural, unless explicitly limited to being singular.

It should be understood that, as used herein, a singular form "one" is intended to include a plural form, unless the context clearly supports exceptions. It should further be understood that "and/or" used herein refers to any and every possible combination of one or more items listed in association.

The above embodiment of the disclosure discloses embodiment numbers just for description, which do not represent advantages and disadvantages of the embodiments.

Those ordinary skilled in the art may understand that the respective or a part of the steps to implement the above embodiments may be completed by hardware, or by a program instructing related hardware. The program may be stored in a computer-readable storage medium, and the storage medium mentioned above may be a read-only memory, a disk or an optical disk, and so on.

Those ordinary skilled in the art should understand that the discussion of any of the above embodiments is just illustrative and is not intended to imply that the scope disclosed by the embodiments of the disclosure (including claims) is limited to these examples. Under thoughts of the embodiments of the disclosure, the technical features of the above embodiments or different embodiments may be further combined, and there are many other changes in different aspects of the above embodiments of the disclosure, which are not provided in details for simplicity. Therefore, any omission, modification, equivalent replacement, improvement, and so on, made in a spirit and principle of the embodiments of the disclosure shall be included in the protection scope of the embodiments of the disclosure.

The invention claimed is:

1. A method for scheduling a multi-node cluster of K-DB database, comprising following steps:
   connecting an application terminal and a scheduler to a cluster of a K-DB database through a service extranet, and connecting respective database nodes in the cluster of the database to each other through an intranet;
   in response to that an application request is received by the scheduler, determining whether the request is a table query, and in response to that the request is the table query, determining whether the request is a multi-table-joint query;
   in response to that the request is the multi-table-joint query, determining tables to be queried in the request, and determining respective database nodes having a highest table version;
   determining types of change values of the respective tables according to types of latest-update operations of the respective tables, and calculating amount of updated data of the respective tables according to the types of the change values; and
   selecting a database node, the amount of updated data of which is the smallest, from the respective database nodes having the highest table version, as a computing node, synchronizing the tables of other database nodes having the highest table version to the computing node, and executing the multi-table-joint query by the computing node,
   wherein the determining the respective database nodes having the highest table version, comprises: obtaining a version number of the table from information recorded in the scheduler, wherein each time a modifying operation is performed on the data of the table, the version of the table is added by one.

2. The method according to claim 1, further comprising:
   in response to that the request is a single-table query, selecting one or more database nodes having the highest table version, to forward the request to the selected database node.

3. The method according to claim 2, further comprising:
   in response to that a request for updating table is received during the single-table query, selecting database nodes having a highest table version from database nodes having no task of the table query, to update the selected database nodes.

4. The method according to claim 1, further comprising:
   in response to that the request is for updating table, determining whether the database node having the highest table version is unique; and
   in response to that the database node having the highest table version is unique, selecting the unique database node, to forward the request to the unique database node.

5. The method according to claim 4, further comprising:
   in response to that the database node having the highest table version is not unique, determining whether the database node, whose state value is the lowest among the database nodes having the highest table version, is unique; and in response to that the database node, whose state value is the lowest among the database nodes having the highest table version, is unique, updating the table at the unique database node.

6. The method according to claim 5, further comprising:
   in response to that the database node, whose state value is the lowest among the database nodes having the highest table version, is not unique, randomly selecting one database node from the database nodes whose state values are the lowest, to update the table of selected database node, and locking the tables of other database nodes.

7. The method according to claim 6, further comprising: in response to that the table completes an update, adding the version number of the table of the database node by one, and unlocking the tables of the other database nodes.

8. A computer device, comprising:
at least one processor; and
a memory, wherein computer-readable instructions that are able to run on the processor, are stored in the memory, and when the computer-readable instructions are executed by the at least one processor, the computer-readable instructions make the at least one processor to perform the steps of the method according to claim 1.

9. A non-volatile computer-readable storage medium, wherein computer-readable instructions are stored in the non-volatile computer-readable storage medium, and when the computer-readable instructions are executed by at least one processor, the computer-readable instructions make the at least one processor to perform the steps of the method according to claim 1.

10. The method according to claim 1, wherein the respective database nodes synchronize data through logs of the respective database nodes.

11. The method according to claim 1, wherein every initial data of databases of the respective database nodes of the cluster of K-DB database is consistent with each other.

12. The method according to claim 1, wherein the scheduler records state information of the tables in databases of the respective database nodes by a unit of table, and the state information comprises any one of: versions of the tables of the respective database nodes, sizes of the tables of the respective database nodes, SQL statements for modifying corresponding to respective table versions of the respective database nodes, and state values of the respective database nodes.

13. The method according to claim 1, wherein, for the application request forwarded by the schedule, in response to that the database node does not send a completion instruction, a state value of the database node is added by one, indicating that the database node is performing a task, and after the task is completed, the database node sends a completion-confirmation instruction to the scheduler, and the state value of the database node is reduced by one.

14. The method according to claim 1, wherein, in response to that a latest-update SQL operation corresponding to the tables is an insert operation or a delete operation, the change values of actual sizes of the tables in the database nodes are calculated; and in response to that the latest-update SQL operation corresponding to the tables is an update operation, the change values of occupancy of the physical spaces of the tables in the database nodes are calculated.

15. The method according to claim 3, wherein, in response to that a new application request for modifying data of table appears during a query operation for the table, the database nodes having the highest table version and having no task of the table query are retrieved, to perform a data-update operation on the retrieved database nodes, and after the tasks of the table query on other database nodes are completed, a data synchronization may be performed the other database nodes.

16. The method according to claim 15, wherein the query operation does not change the version of the table, but change a state value of the database node, and during the query operation, the state value of the database node increases accordingly.

17. The method according to claim 1, wherein, in response to that the scheduler receives the application request, the scheduler records an SQL statement of the application request, and the scheduler checks the table to be modified in the request, retrieves recorded information, and selects one database node having the highest table version, to forward the application request to the selected database node.

18. The method according to claim 6, wherein the locked tables are allowed to be queried, not allowed to be updated.

19. The method according to claim 7, wherein, in response to that the table completes the update, the database node sends a confirmation instruction to the scheduler, then the table version of the database node is added by one, and at the same time, the scheduler unlocks table-level locks of the other database nodes, and sends an instruction to instruct the database node to broadcast updated data of the table to the other database nodes.

20. The method according to claim 19, wherein, in response to that the other database nodes receive the instruction, and the other database nodes start to update data of the tables, and after data updating is completed, the other database nodes respectively send the confirmation instruction to the scheduler, and the version numbers of the tables of the other database nodes are respectively added by one.

* * * * *